United States Patent
Mukherjee et al.

(10) Patent No.: US 12,505,003 B2
(45) Date of Patent: Dec. 23, 2025

(54) SYSTEM AND METHOD FOR MULTI IMAGE MATCHING FOR OUTAGE PREDICTION, PREVENTION, AND MITIGATION FOR TECHNOLOGY INFRASTRUCTURE USING HYBRID DEEP LEARNING

(71) Applicant: Bank of America Corporation, Charlotte, NC (US)

(72) Inventors: Maharaj Mukherjee, Poughkeepsie, NY (US); Utkarsh Raj, Charlotte, NC (US); Colin Murphy, Charlotte, NC (US); Elvis Nyamwange, Little Elm, TX (US); Suman Roy Choudhury, Jersey City, NJ (US); Vijay Kumar Yarabolu, Hyderabad (IN); Carl Benda, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 151 days.

(21) Appl. No.: 18/198,367

(22) Filed: May 17, 2023

(65) Prior Publication Data
US 2024/0385917 A1 Nov. 21, 2024

(51) Int. Cl.
*G06F 11/00* (2006.01)
*G06N 3/0464* (2023.01)
(Continued)

(52) U.S. Cl.
CPC ............ *G06F 11/004* (2013.01); *G06V 10/74* (2022.01); *G06V 10/764* (2022.01); *G06N 3/0464* (2023.01)

(58) Field of Classification Search
CPC ...... G06N 20/20; G06N 3/0464; G06V 10/74; G06V 10/764; G06F 11/004
See application file for complete search history.

(56) References Cited

U.S. PATENT DOCUMENTS 11,625,293 B1 4/2023 Ratkovic et al.
2014/0278496 A1 9/2014 Spencer
(Continued)

FOREIGN PATENT DOCUMENTS

SG  10201610116 P  *  2/2016  ............. G06N 3/044

OTHER PUBLICATIONS

Di Liu et al. "An Improved Dynamic Load-balancing Model" IEEE (Year: 2016).*

(Continued)

*Primary Examiner* — Bryce P Bonzo
*Assistant Examiner* — Audrey Emma Whitesell
(74) *Attorney, Agent, or Firm* — Banner & Witcoff, Ltd.

(57) ABSTRACT

A computing platform may train a hybrid deep learning model, including a CNN and RNN, to predict system failure for a system based on telemetry state images and transitions between the telemetry state images. The computing platform may receive initial telemetry data, and may generate an initial telemetry state image. The computing platform may receive additional telemetry data, and may generate an additional telemetry state image. The computing platform may classify, using the CNN and based on historical telemetry state images, the initial telemetry state image and the additional telemetry state image. The computing platform may identify, using the RNN and based on the classified telemetry state images and transitions between the classified telemetry state images, a matching pattern. The computing platform may identify, using the identified matching pattern, a likelihood of failure for the system, and may cause modification of operations at the system to prevent a predicted failure.

20 Claims, 12 Drawing Sheets

(51) Int. Cl.
*G06V 10/74* (2022.01)
*G06V 10/764* (2022.01)

(56) References Cited

U.S. PATENT DOCUMENTS

| | | | |
|---|---|---|---|
| 2014/0310564 A1* | 10/2014 | Mallige | G06F 11/0751 714/47.1 |
| 2016/0041948 A1 | 2/2016 | Vichare et al. | |
| 2016/0155315 A1* | 6/2016 | McElhinney | G05B 23/024 340/502 |
| 2016/0266962 A1* | 9/2016 | Rajasekharan | G06F 9/5072 |
| 2018/0157963 A1* | 6/2018 | Salti | G06N 3/045 |
| 2019/0179723 A1 | 6/2019 | Allin et al. | |
| 2019/0199602 A1 | 6/2019 | Zhang et al. | |
| 2020/0125465 A1 | 4/2020 | Choi et al. | |
| 2020/0201697 A1 | 6/2020 | Torng et al. | |
| 2020/0295986 A1 | 9/2020 | Rathinasabapathy et al. | |
| 2021/0056678 A1* | 2/2021 | Al Shehri | G06T 7/0004 |
| 2022/0246657 A1 | 8/2022 | Lin et al. | |
| 2022/0269035 A1 | 8/2022 | Kimura et al. | |
| 2022/0271072 A1 | 8/2022 | Miyata | |
| 2022/0295000 A1 | 9/2022 | Yamazaki et al. | |
| 2022/0295006 A1 | 9/2022 | Kashiwagi | |
| 2022/0310684 A1 | 9/2022 | Sakata et al. | |
| 2022/0321791 A1 | 10/2022 | Lin et al. | |
| 2022/0372181 A1 | 11/2022 | Iwata et al. | |
| 2022/0392944 A1 | 12/2022 | Tochigi et al. | |
| 2022/0399469 A1 | 12/2022 | Minari | |
| 2022/0408046 A1 | 12/2022 | Katou et al. | |
| 2022/0415947 A1 | 12/2022 | Hasegawa | |
| 2022/0417464 A1 | 12/2022 | Tatsuzawa | |
| 2023/0005981 A1 | 1/2023 | Ito et al. | |
| 2023/0013149 A1 | 1/2023 | Akiyama | |
| 2023/0014856 A1 | 1/2023 | Goto | |
| 2023/0020741 A1 | 1/2023 | Liu et al. | |
| 2023/0058009 A1 | 2/2023 | Tsuchimoto et al. | |
| 2023/0073737 A1 | 3/2023 | Li et al. | |
| 2023/0110102 A1 | 4/2023 | Li et al. | |

OTHER PUBLICATIONS

Javier Lopez et al. "A Resilient Architecture for the Smart Grid" IEEE (Year: 2018).*
Emre Gures. "Machine Learning-Based Load Balancing Algorithms in Future Heterogeneous Networks: A Survey" IEEE. (Year: 2022).*
Li Liu et al. "Machine Learning-Based Load Balancing Algorithms in Future Heterogeneous Networks: A Survey" IEEE (Year: 2007).*
Areeg Samir et al. "A Controller Architecture for Anomaly Detection, Root Cause Analysis and Self-Adaptation for Cluster Architectures" (Year: 2019).*
Qing Wang et al. "Constructing the Knowledge Base for Cognitive IT Service Management" (Year: 2017).*
Jun. 3, 2025—(US) Notice of Allowance—U.S. Appl. No. 18/197,924.
Jan. 2, 2025—(US) Notice of Allowance—U.S. Appl. No. 18/201,817.
Apr. 8, 2025—(US) Notice of Allowance—U.S. Appl. No. 18/201,817.

* cited by examiner

SYSTEM AND METHOD FOR MULTI IMAGE MATCHING FOR OUTAGE PREDICTION, PREVENTION, AND MITIGATION FOR TECHNOLOGY INFRASTRUCTURE USING HYBRID DEEP LEARNING

CROSS REFERENCE TO RELATED APPLICATIONS

This application is related to U.S. application Ser. No. 18/198,375, filed May 17, 2023, and entitled "System and Method for Multi Image Matching for Outage Prediction, Prevention, and Mitigation for Technology Infrastructure Using Rules-Based State Machines," which is incorporated herein by reference in its entirety.

BACKGROUND

In some instances, applications may rely on a technology infrastructure to ensure their operation. Accordingly, it may be important to create a reliable technology infrastructure and minimize the occurrence of any corresponding failures/outages. In some instances, a current system performance may be analyzed to identify a likelihood of failure. In some instances, however, a series of previous events occurring in a time series leading up to a current time may be relevant to the analysis. In failing to consider such information, an accuracy of failure detection may be reduced. Accordingly, it may be important to improve the process of preemptive failure detection to prevent system failures and/or outages.

SUMMARY OF THE INVENTION

Aspects of the disclosure provide effective, efficient, scalable, and convenient technical solutions that address and overcome the technical problems associated with system failure prediction and prevention. In accordance with one or more embodiments of the disclosure, a computing platform comprising at least one processor, a communication interface, and memory storing computer-readable instructions may train a hybrid deep learning model to predict system failure for a system based on telemetry state images and transitions between the telemetry state images, where the hybrid deep learning model may include a convolutional neural network (CNN) and a recurrent neural network (RNN). The computing platform may receive initial telemetry data. The computing platform may generate, based on the initial telemetry data, an initial telemetry state image. The computing platform may receive additional telemetry data. The computing platform may generate, based on the additional telemetry data, an additional telemetry state image. The computing platform may classify, using the CNN and based on historical telemetry state images, the initial telemetry state image and the additional telemetry state image. The computing platform may identify, using the RNN and based on the classified telemetry state images and transitions between the classified telemetry state images, a matching pattern. The computing platform may identify, using the identified matching pattern, a likelihood of failure for the system. The computing platform may send, based on the likelihood of failure for the system, one or more preemptive resolution commands causing modification of operations at the system to prevent a predicted failure.

In one or more instances, training the CNN may include training the CNN to classify input telemetry data state images as matching one of the historical telemetry state images. In one or more instances, training the RNN may include training the RNN to identify a match between: a pattern defined by the classified input telemetry data state images and their corresponding transitions, and a stored pattern defined by the historical telemetry state images and their corresponding transitions.

In one or more examples, training the RNN may include training the RNN to identify, based on the matching pattern, the likelihood of failure. In one or more examples, the RNN may be enhanced using long short term memory (LSTM).

In one or more instances, the RNN may be a hierarchic RNN model, where a first layer of the RNN may be configured to perform pattern matching at a first level of granularity, and a second layer of the RNN may be configured to perform pattern matching at a second level of granularity, where the second level of granularity is more detailed than the first level of granularity. In one or more instances, identifying the likelihood of failure for the system may include using a rules-based state machine to identify the likelihood of failure.

In one or more examples, identifying, using the identified matching pattern, the likelihood of failure for the system may include identifying a likelihood of failure of the matching pattern, wherein the matching pattern is labelled based on the likelihood of failure of the matching pattern. In one or more examples, the computing platform may compare the likelihood of failure of the matching pattern to a failure threshold, where sending the one or more preemptive resolution commands causing modification of the operations at the system to prevent the predicted failure may be in response to identifying that the likelihood of failure of the matching pattern meets or exceeds the failure threshold.

In one or more instances, sending the one or more preemptive resolution commands may include directing a load management server associated with the system to redirect incoming requests away from the system. In one or more instances, sending the one or more preemptive resolution commands may include directing a user device to display a recommended solution to avoid the predicted failure along with a prompt for whether or not the recommended solution should be executed.

In one or more examples, the computing platform may receive user input accepting the recommended solution. The computing platform may execute, in response to receiving the user input, the recommended solution. In one or more instances, the computing platform may receive third telemetry data. The computing platform may generate, based on the third telemetry data, a third telemetry state image. The computing platform may classify, using the CNN and based on historical telemetry state images, the third telemetry state image, which may result in an updated set of classified telemetry state images. The computing platform may identify, using the RNN and based on the updated set of classified telemetry state images and transitions between the updated set of classified telemetry state images, an updated matching pattern. The computing platform may identify, using the identified updated matching pattern, a new likelihood of failure for the system.

BRIEF DESCRIPTION OF DRAWINGS

The present disclosure is illustrated by way of example and is not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

The following description relates to a system and method for multi-image matching for outage prediction, prevention, and mitigation for technology infrastructure using hybrid deep learning, as is described further below. Preventing and predicting outages for a technology infrastructure may be key for making sure that the backbone of the customer and employee facing applications are running and not down. The outage prediction may be enhanced by not just looking at the current status of the overall system, but a series of other events that might have led to the current status. Predicting whether the current status is safe or may lead to some unsafe condition leading to outages may involve taking the series of system statuses coming at each time interval. In this description, a system and method for multi image matching for outage prediction, prevention, and mitigation for technology infrastructure using hybrid deep learning, is described, where each image represents a heatmap corresponding to the current status of the system.

Thermal images may be used to capture the overall health and capacity of the whole infrastructure system. The thermal image may be created by starting with a table of raw telemetry data. The data is further normalized to convert each cell value between 0.0 and 1.0 in floating point numbers. The resulting matrix may be a normalized image. Examples of this normalized image can be displayed by appropriate thresholding and associating a color with each of the threshold ranges. This is shown, for example, in diagram 700 of FIG. 7 and diagram 800 of FIG. 8, which depict normalized images.

These normalized images may represent the overall health of the system and may be directly attributed and linked to any events, incidents, and consequently any alerts generated.

Figure 7:
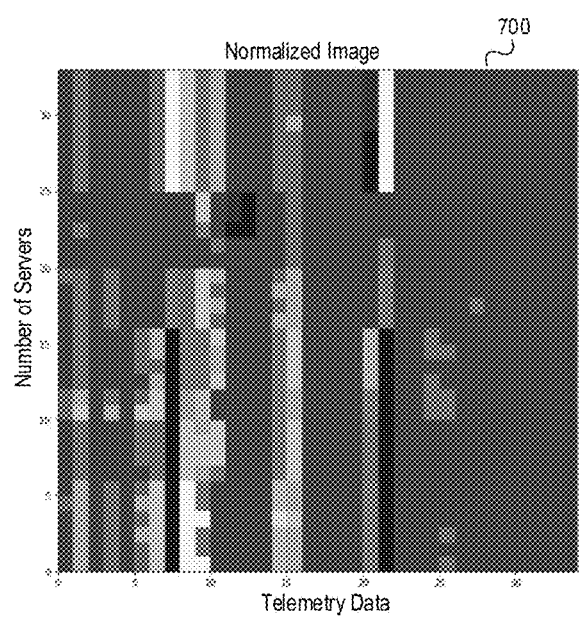
FIGS. 7-10 depict illustrative diagrams for using hybrid deep learning to perform multi image matching for outage prediction, prevention, and mitigation in accordance with one or more example embodiments.
Figure 8:
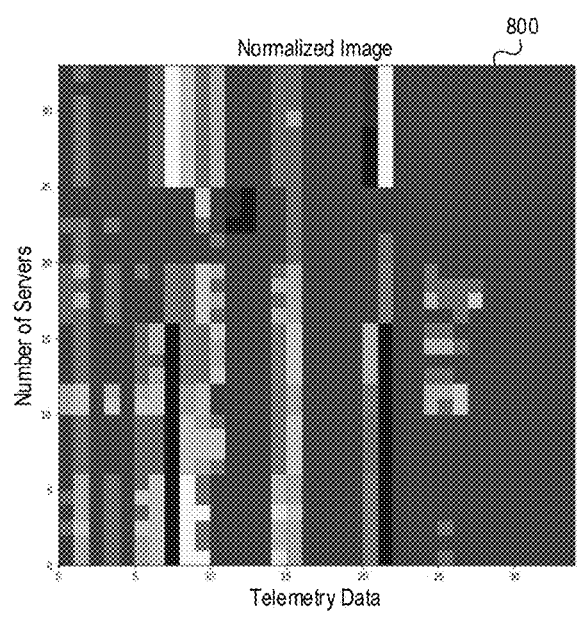

FIGS. 7 and 8 depict two separate images of the overall system status at two different times.

Figure 9:
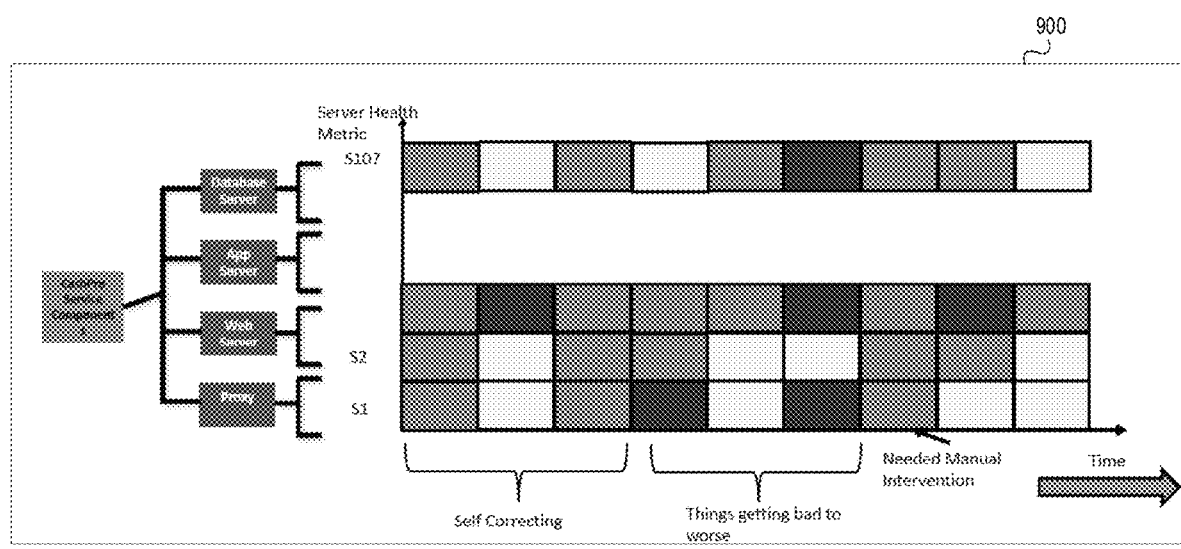

The heatmap or thermal images of different times following each other may be considered to predict any potential outages so that steps can be taken to mitigate or prevent potential outages. Diagram 900 of FIG. 9 and diagram 1000 of FIG. 10 show several examples of how different image series may lead to different outcomes.

Figure 10:
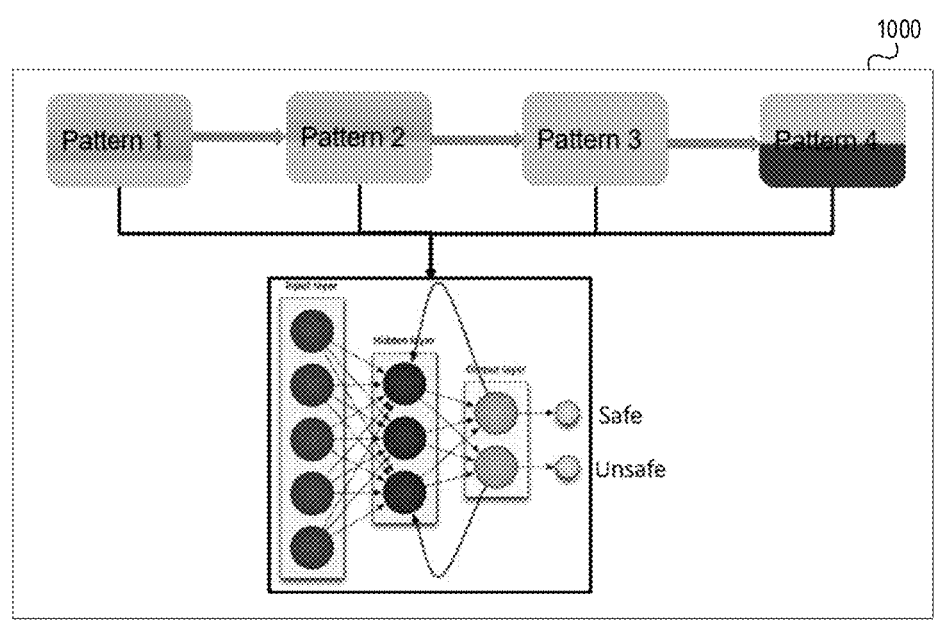

In order to distinguish different series of patterns from one another, hybrid neural network based deep learning may be used as shown in diagram 1000 of FIG. 10. The hybrid neural network may consist of two types of neural networks: Convolution Neural Network (CNN) and Recurrent Neural Network (RNN).

In the first step the CNN can efficiently distinguish one type of pattern from another and classify them in different categories. Such as Pattern1, Pattern2, . . . , Pattern n etc.

However, it is advantageous to not only distinguish between different types of patterns, but to also distinguish one series of patterns from another. The distinctions between different series of patterns may be accomplished by the RNN in the second step, as is shown in diagram 1000 of FIG. 10. To improve the performance of RNN we may also use RNN enhanced by Long Short Term Memory (LSTM), and/or multiple RNNs in a hierarchic model. These and other features are described in greater details below.

Figure 1A:
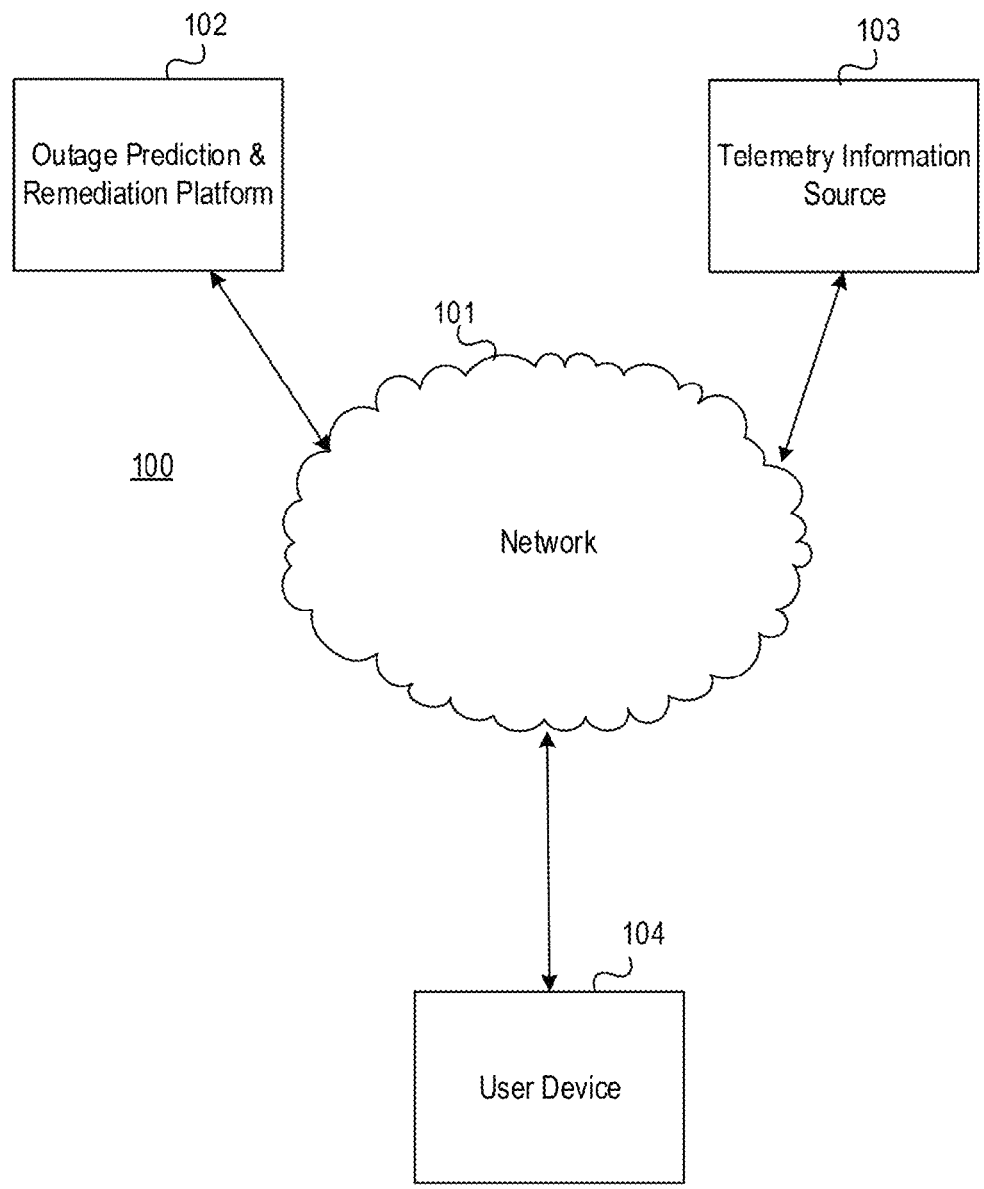
FIGS. 1A and 1B depict an illustrative computing environment for using hybrid deep learning to perform multi image matching for outage prediction, prevention, and mitigation in accordance with one or more example embodiments.
Figure 1B:
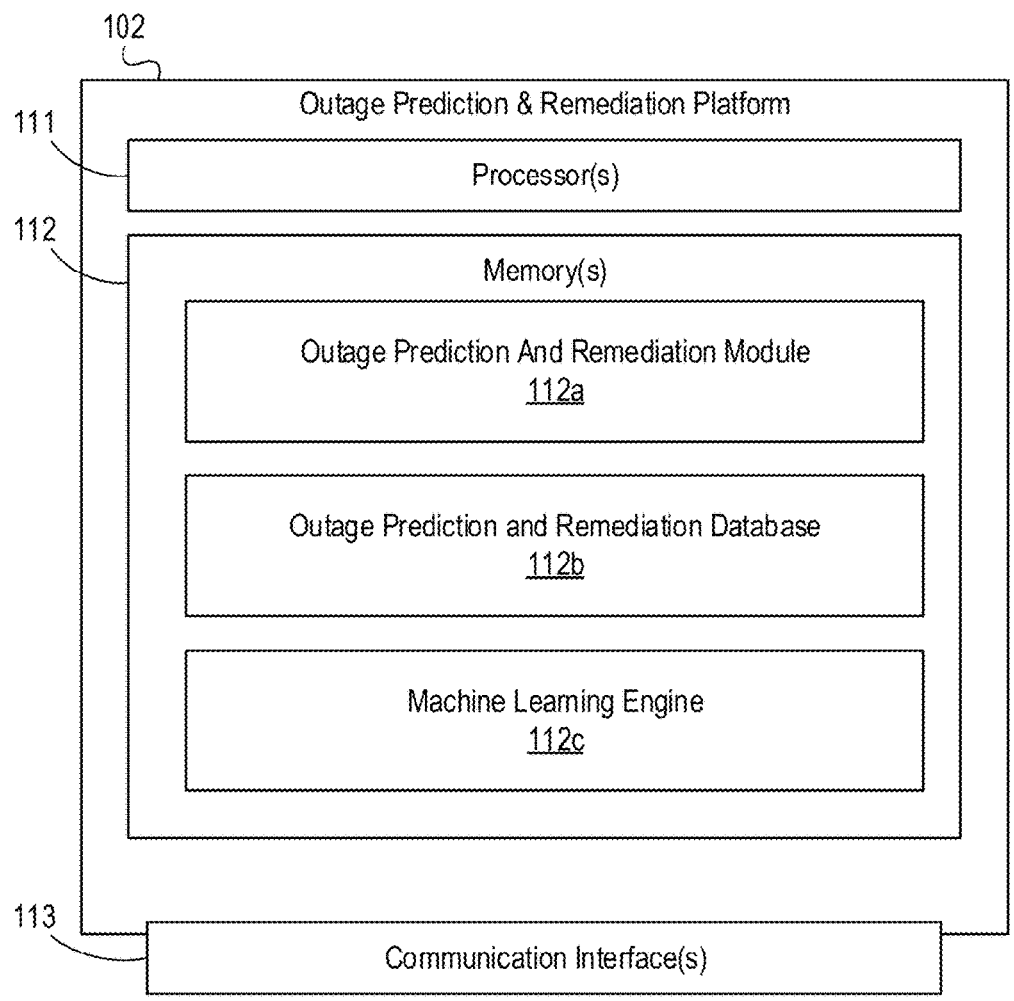

FIGS. 1A-1B depict an illustrative computing environment for using hybrid deep learning to perform multi image matching for outage prediction, prevention, and mitigation in accordance with one or more example embodiments. Referring to FIG. 1A, computing environment 100 may include one or more computer systems. For example, computing environment 100 may include an outage prediction and remediation platform 102, telemetry information source 103, and user device 104.

Outage prediction and remediation platform 102 may include one or more computing devices and/or other computer components (e.g., processors, memories, communication interfaces, or the like). For example, the outage prediction and remediation platform 102 may be configured to generate, update, and/or otherwise maintain a hybrid deep learning model that includes a convolutional neural network (CNN) and a recurrent neural network (RNN). In some instances, the CNN may be trained to classify state images based on historical state images. In these instances, the RNN may use the classifications output by the CNN to identify matching state image patterns (e.g., sequences of state images and their corresponding transitions) based on historical state image patterns. The RNN may further include labels corresponding to a likelihood of failure for a given state image based on the identified matching pattern. Based on the identified likelihood of failure, the outage prediction and remediation platform 102 may be configured to trigger preemptive resolution actions to avoid any predicted failures.

Telemetry information source 103 may be or include one or more computing devices (e.g., servers, server blades, or the like) and/or other computer components (e.g., processors, memories, communication interfaces, and/or other components). In some instances, the telemetry information source 103 may be configured to monitor a plurality of individual systems to collect the corresponding telemetry data. In other instances, the telemetry information source 103 may be the source of the telemetry data itself (e.g., producing the telemetry data). Although a single telemetry information source 103 is shown, any number of telemetry information sources 103 may be included in the system architecture without departing from the scope of the disclosure.

User device 104 may be or include one or more devices (e.g., laptop computers, desktop computer, smartphones, tablets, and/or other devices) configured for use in receiving preemptive resolution information from the outage prediction and remediation platform. In some instances, the user device 104 may be configured to display graphical user interfaces (e.g., preemptive resolution information, or the like). Any number of such user devices may be used to implement the techniques described herein without departing from the scope of the disclosure.

Computing environment 100 also may include one or more networks, which may interconnect outage prediction and remediation platform 102, telemetry information source 103, and user device 104. For example, computing environment 100 may include a network 101 (which may interconnect, e.g., outage prediction and remediation platform 102, telemetry information source 103, and user device 104).

In one or more arrangements, outage prediction and remediation platform 102, telemetry information source 103, and user device 104 may be any type of computing device capable of receiving a user interface, receiving input via the user interface, and communicating the received input to one or more other computing devices. For example, outage prediction and remediation platform 102, telemetry information source 103, user device 104, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of outage prediction and remediation platform 102, telemetry information source 103, and user device 104 may, in some instances, be special-purpose computing devices configured to perform specific functions.

Referring to FIG. 1B, outage prediction and remediation platform 102 may include one or more processors 111, memory 112, and communication interface 113. A data bus may interconnect processor 111, memory 112, and communication interface 113. Communication interface 113 may be a network interface configured to support communication between outage prediction and remediation platform 102 and one or more networks (e.g., network 101, or the like). Memory 112 may include one or more program modules having instructions that when executed by processor 111 cause outage prediction and remediation platform 102 to perform one or more functions described herein and/or one or more databases that may store and/or otherwise maintain information which may be used by such program modules and/or processor 111. In some instances, the one or more program modules and/or databases may be stored by and/or maintained in different memory units of outage prediction and remediation platform 102 and/or by different computing devices that may form and/or otherwise make up outage prediction and remediation platform 102. For example, memory 112 may have, host, store, and/or include outage prediction and remediation module 112a, outage prediction and remediation database 112b, and machine learning engine 112c. Outage prediction and remediation module 112a may have instructions that direct and/or cause outage prediction and remediation platform 102 to execute advanced optimization techniques to generate, apply, and/or otherwise maintain a deep learning model for predicting and remediating potential system failures. Outage prediction and remediation database 112b may store information used by outage prediction and remediation module 112a, in executing, generating, applying, and/or otherwise maintaining a deep learning model for predicting and remediating potential system failures and/or in performing other functions. Machine learning engine 112c may be used to train, deploy, and/or otherwise refine models used to support functionality of the outage prediction and remediation module 112a through both initial training and one or more dynamic feedback loops, which may, e.g., enable continuous improvement of the outage prediction and remediation platform 102 and further optimize the prediction and remediation of system failures.

Figure 2A:
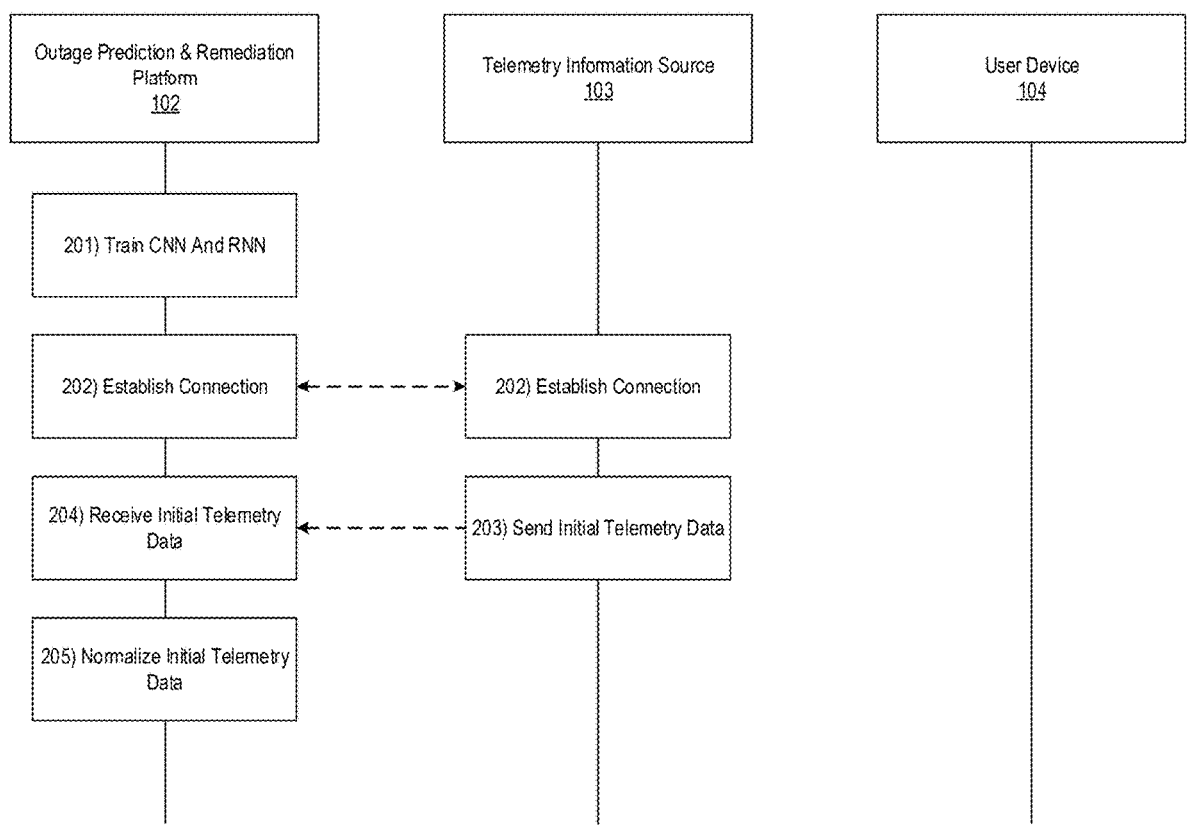
FIGS. 2A-2D depict an illustrative event sequence for using hybrid deep learning to perform multi image matching for outage prediction, prevention, and mitigation in accordance with one or more example embodiments.

FIGS. 2A-2D depict an illustrative event sequence for using a hybrid deep learning model to perform multi image matching for outage prediction, prevention, and mitigation in accordance with one or more example embodiments. Referring to FIG. 2A, at step 201, the outage prediction and remediation platform 102 may train a deep learning model. For example, the outage prediction and remediation platform 102 may receive historical telemetry data (e.g., from the telemetry information source 103, and/or otherwise). The outage prediction and remediation platform 102 may normalize the historical telemetry data to create normalized telemetry data values between zero and one (e.g., in floating point numbers). Based on the normalized telemetry data, the outage prediction and remediation platform 102 may generate telemetry state images, similar to the normalized images depicted in FIGS. 7 and 8. The outage prediction and remediation platform 102 may use these normalized images to train a CNN, which may, e.g., be part of the hybrid deep learning model, to cluster and/or otherwise classify input images based on these historical telemetry state images used to train the model. For example, by inputting these normalized images into the CNN, the outage prediction and remediation platform 102 may train the CNN to recognize features in telemetry state images that may enable the CNN to perform image matching between newly input and historical telemetry state images. In some instances, the outage prediction and remediation platform 102 may train the CNN using unsupervised techniques to categorize the historical images. In other instances, the outage prediction and remediation platform 102 may train the CNN using partially supervised techniques to categorize the historical images.

The outage prediction and remediation platform 102 may further train, as part of the hybrid deep learning model, an RNN. For example, the outage prediction and remediation platform 102 may train the RNN to perform pattern matching between an input pattern of telemetry state images (and their corresponding transitions) and historical patterns of telemetry state images (and their corresponding transitions). In training the RNN, the outage prediction and remediation platform 102 may label the historical patterns of telemetry state images based on historical failure information. For example, if a historical pattern of state image #1, state image #2, state image #3 resulted in a system failure, the outage prediction and remediation platform 102 may label this pattern accordingly (e.g., with a likelihood of failure score (e.g., 100), warning label (e.g., red alert, unsafe, or the like), or the like). Further with this example, if a historical pattern of state image #1, state image #2, state image #4, did not result in a system failure, the outage prediction and remediation platform 102 may label this pattern accordingly (e.g., with a likelihood of failure score (e.g., 0), warning label (e.g., normal, safe, etc.), or the like). Further to this example, after identifying that there are two different outcomes for the historical pattern of state image #1, state image #2 based on which state image occurs next (e.g., state image #3 or state image #4), the outage prediction and remediation platform 102 may label this pattern accordingly (e.g., with a likelihood of failure score (e.g., 50), warning label (e.g., yellow alert), and/or otherwise).

In some instances, the RNN may be further configured and/or otherwise enhanced with long short term memory (LSTM), which may, e.g., improve an ability of the RNN to perform pattern matching as the length of such patterns increases. Additionally or alternatively, the RNN may be configured as a hierarchic RNN model, where each layer of the RNN is configured to perform a more granular image and/or pattern matching comparison (e.g., a first layer might not be configured to pick up a discrepancy between images/patterns that a second, more granular, layer may). In some instances, the enhancements of the LSTM and/or hierarchic RNN model may be toggled on and off manually, automatically based on an error rate, and/or otherwise.

In doing so, the outage prediction and remediation platform 102 may train the RNN to perform pattern matching, and to identify a likelihood of system failure accordingly. Furthermore, by training both the CNN and RNN to create a hybrid deep learning model, the outage prediction and remediation platform 102 may be configured to identify a likelihood of failure based not only on a current system state, but also on a pattern of previous and potential future states, along with the corresponding transitions between such states, which may, e.g., increase an accuracy of the likelihood of failure determination. Furthermore, the benefits of speed and accuracy may be obtained from the use of the CNN.

With further reference to FIG. 2A, at step 202, the telemetry information source 103 may establish a connection with the outage prediction and remediation platform 102. For example, the telemetry information source 103 may establish a first wireless data connection with the outage prediction and remediation platform 102 to link the telemetry information source 103 to the outage prediction and remediation platform 102 (e.g., in preparation for sending telemetry information). In some instances, the telemetry information source 103 may identify whether or not a connection is already established with the outage prediction and remediation platform 102. If a connection is already established with the outage prediction and remediation platform 102, the telemetry information source 103 might not re-establish the connection. If a connection is not yet established with the outage prediction and remediation platform 102, the telemetry information source 103 may establish the first wireless data connection as described herein.

At step 203, the telemetry information source 103 may send initial telemetry data to the outage prediction and remediation platform 102. For example, the telemetry information source 103 may send time stamps, dates, system names, computer processing unit (CPU) information, memory information, and/or other telemetry information corresponding to performance of a plurality of systems (and/or the telemetry information source 103 itself). In some instances, the telemetry information source 103 may send the initial telemetry data while the first wireless data connection is established.

At step 204, the outage prediction and remediation platform 102 may receive the initial telemetry data sent at step 203. For example, the outage prediction and remediation platform 102 may receive the initial telemetry data via the communication interface 113 and while the first wireless data connection is established.

At step 205, the outage prediction and remediation platform 102 may normalize the initial telemetry data received at step 204. For example, the outage prediction and remediation platform 102 may convert the initial telemetry data (which may, e.g., include values of different sizes, ranges, or the like) to values between zero and one. In doing so, the outage prediction and remediation platform 102 may configure the initial telemetry data for representation as an initial telemetry state image.

Figure 2B:
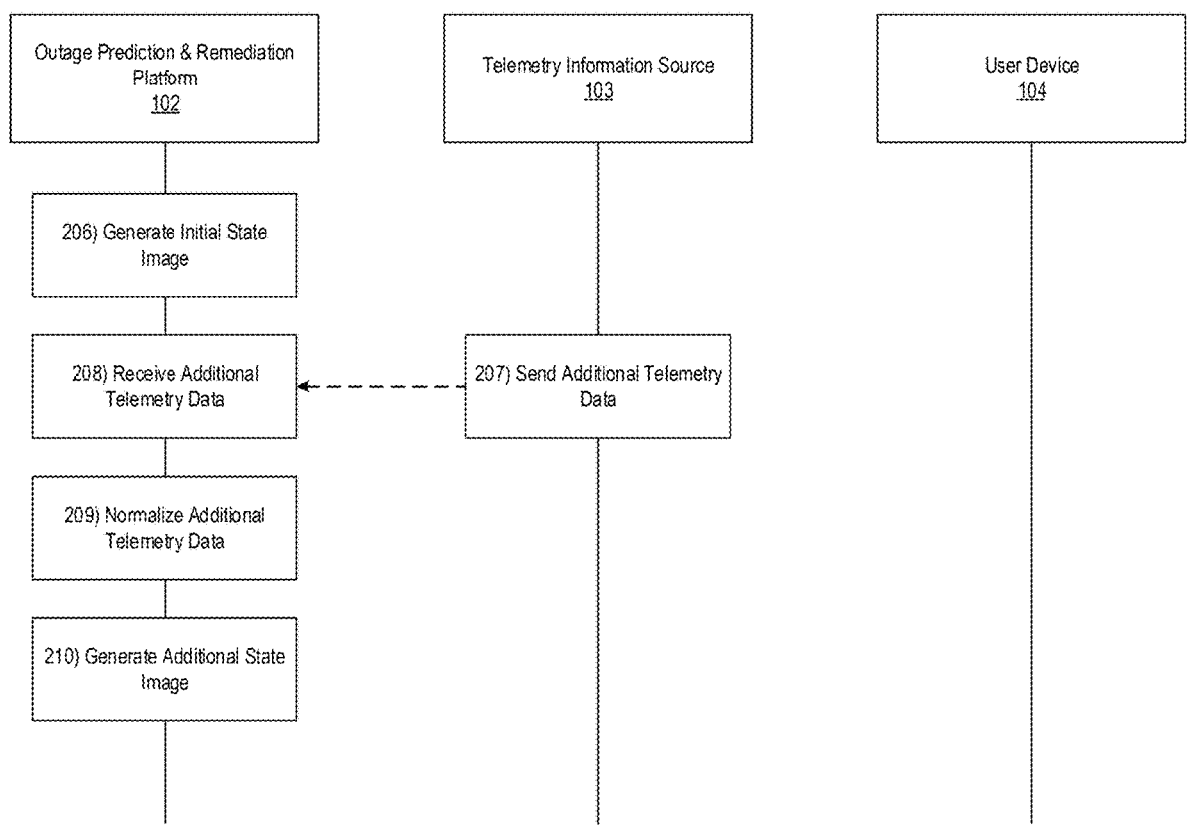

Referring to FIG. 2B, at step 206, the outage prediction and remediation platform 102 may generate an initial telemetry state image using the normalized initial telemetry data. For example, the outage prediction and remediation platform 102 may generate an image similar to the diagram 700 depicted in FIG. 7. For example, the initial telemetry state image may include the initial telemetry data plotted against the various systems corresponding to the initial telemetry data and at a given time. Specifically, the initial telemetry state image may represent a heatmap corresponding to a current status of a system represented by the initial telemetry data. In essence, the initial telemetry state image may be a snapshot representation of the performance of these systems at a given time.

In some instances, in generating the initial telemetry state image, the outage prediction and remediation platform 102 may apply one or more thresholding techniques. As a simple example, the outage prediction and remediation platform 102 may use green to represent any values from 0-3 (inclusive), yellow to represent any values from 3.1-6 (inclusive), and red to represent any values from 6.1-10 (inclusive). Any number of colors and/or threshold ranges may be implemented without departing from the scope of the disclosure.

At step 207, the telemetry information source 103 may send additional telemetry data to the outage prediction and remediation platform 102. For example, the telemetry information source 103 may send telemetry data similar to the telemetry data sent at step 203, but which may correspond to a later time. In some instances, the telemetry information source 103 may send the additional telemetry data to the outage prediction and remediation platform 102 while the first wireless data connection is established.

At step 208, the outage prediction and remediation platform 102 may receive the additional telemetry data sent at step 207. For example, the outage prediction and remediation platform 102 may receive the additional telemetry data from the telemetry information source 103 via the communication interface 113 and while the first wireless data connection is established.

At step 209, the outage prediction and remediation platform 102 may normalize the additional telemetry data. For example, the outage prediction and remediation platform 102 may perform actions similar to those described above at step 205 with regard to the initial telemetry data.

At step 210, the outage prediction and remediation platform 102 may generate an additional telemetry state image (e.g., using the additional telemetry data received at step 209). For example, the outage prediction and remediation platform 102 may perform actions similar to those described above at step 206 with regard to the initial telemetry state image.

Figure 2C:
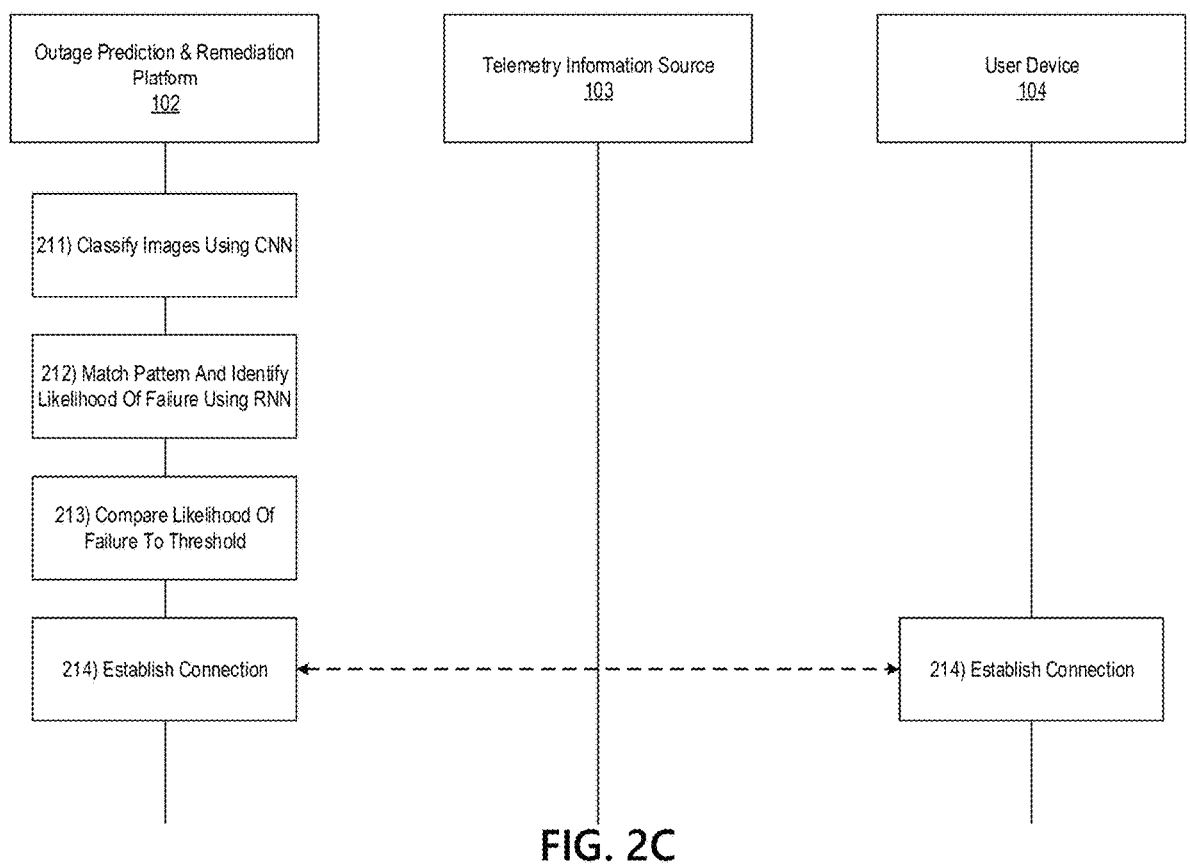

Referring to FIG. 2C, at step 211, the outage prediction and remediation platform 102 may classify the initial and/or additional telemetry state images using the CNN. For example, the outage prediction and remediation platform 102 may input the initial and/or additional telemetry state images into the CNN, which may, e.g., identify matching historical telemetry state images by comparing features of the state images. In some instances, the CNN may identify an exact match. In other instances, the CNN may identify a threshold match (e.g., at least a threshold level match).

In some instances, in classifying the initial and/or additional telemetry state images, the CNN may receive images in a spatial domain, and may convert (e.g., using a first Fourier transform or otherwise) the images into the frequency domain. In doing so, the CNN may make translations, rotations, inversions, and/or other features of the images invariant, which may, e.g., increase both a speed and an accuracy at which the CNN may classify the images.

At step 212, after classifying the initial and/or additional telemetry state images using the CNN, the outage prediction and remediation platform 102 may input this classification information into the RNN to identify a matching telemetry state image pattern. For example, the outage prediction and remediation platform 102 may identify a matching pattern, corresponding to the initial telemetry state image, the additional telemetry state image, and the transition between them. For example, in referring to diagram 1000 of FIG. 10, the RNN might not merely identify that the initial telemetry state image matches "Pattern #1" and that the additional telemetry state image matches "Pattern #2," but may also identify that there was a transition from the initial telemetry state image, which may match "Pattern #1," to the additional telemetry state image represented by "Pattern #2." In doing so, the RNN may identify a sequential pattern of telemetry state images and their transitions that corresponds to a pattern represented by the initial and/or additional telemetry state images.

After identifying the matching pattern, the outage prediction and remediation platform 102 may identify, using the RNN, a likelihood of failure and/or warning corresponding to the matching pattern. For example, the outage prediction and remediation platform 102 may use the RNN to identify a likelihood of failure and/or warning that corresponds to a progression from the initial telemetry state image to the additional telemetry state image. For example, as is described above with regard to training the RNN, stored telemetry state images may have been labelled based on their corresponding likelihoods of failure, warning labels, and/or otherwise. Accordingly, the RNN may identify a label associated with the identified matching pattern and may output this information. In some instances, the RNN may identify a numeric score representing a likelihood of failure. Additionally or alternatively, the RNN may identify a warning level, indicating a severity and/or imminence of failure.

In identifying the likelihood of failure, the RNN may identify a likelihood of failure corresponding to the additional telemetry state image, when taking into account the progression from the initial telemetry state image to the additional telemetry state image. For example, the likelihood of failure of the additional telemetry state image may vary depending on the progression of images leading up to it.

In some instances, the RNN may activate use of the LSTM enhancement in identifying the likelihood of failure. For example, the RNN may be configured with an LSTM threshold corresponding to a number of telemetry state images in a pattern. In these instances, if the number of telemetry state images being analyzed by the RNN meets or exceeds the LSTM threshold, the RNN may trigger the use of the LSTM to improve accuracy of the pattern matching. In contrast, if the number of telemetry state images being analyzed by the RNN does not meet or exceed the LSTM threshold, the RNN might not trigger the use of the LSTM. Additionally or alternatively, the RNN may trigger the LSTM based on an error rate exceeding a predetermined error threshold. In doing so, the RNN may increase accuracy, while balancing the consumption of computing/processing power. Similarly, the RNN may balance customer experience, for example, by avoiding the use of the LSTM where it may perform too granular of an analysis (e.g., identify discrepancies between images or patterns that may be irrelevant, such as a difference in font type, or the like) and flag such discrepancies for the customer.

In some instances, the RNN may activate use of the hierarchic RNN enhancement in identifying the likelihood of failure. For example, the RNN may trigger the use of the hierarchic RNN where an increasing degree of granularity is wanted in the image/pattern comparison. For example, the RNN may compare an error rate to a predetermined error threshold. If the predetermined error threshold is met or exceeded, the RNN may trigger use of the hierarchic RNN. If the predetermined error threshold is not met or exceeded, the RNN might not trigger use of the hierarchic RNN. Similar to aspects described above with regard to use of the LSTM, this may enable the RNN to produce more accurate results while balancing the demand on computing power that such additional analysis may consume.

At step 213, the outage prediction and remediation platform 102 may compare the likelihood of failure to one or more failure thresholds. In some instances, the failure thresholds may represent numeric values (e.g., against which numeric representations of the likelihood of failure may be compared), warning thresholds (e.g., a particular warning label in a series of warning labels, increasing in severity, against which such likelihood of failure warning labels may be compared), and/or otherwise. In some instances, if the outage prediction and remediation platform 102 identifies that the likelihood of failure meets or exceeds the threshold, the outage prediction and remediation platform 102 may proceed to step 214. Otherwise, if the outage prediction and remediation platform 102 identifies that the likelihood of failure does not meet or exceed the threshold, the outage prediction and remediation platform 102 may proceed to step 218.

At step 214, the outage prediction and remediation platform 102 may establish a connection with the user device 104. For example, the outage prediction and remediation platform 102 may establish a second wireless data connection with the user device 104 to link the outage prediction and remediation platform 102 to the user device 104 (e.g., in preparation for sending pre-emptive resolution commands). In some instances, the outage prediction and remediation platform 102 may identify whether or not a connection is already established with the user device 104. If a connection is already established with the user device 104, the outage prediction and remediation platform 102 might not re-establish the connection. If a connection is not yet established with the user device 104, the outage prediction and remediation platform 102 may establish the second wireless data connection as described herein.

Figure 2D:
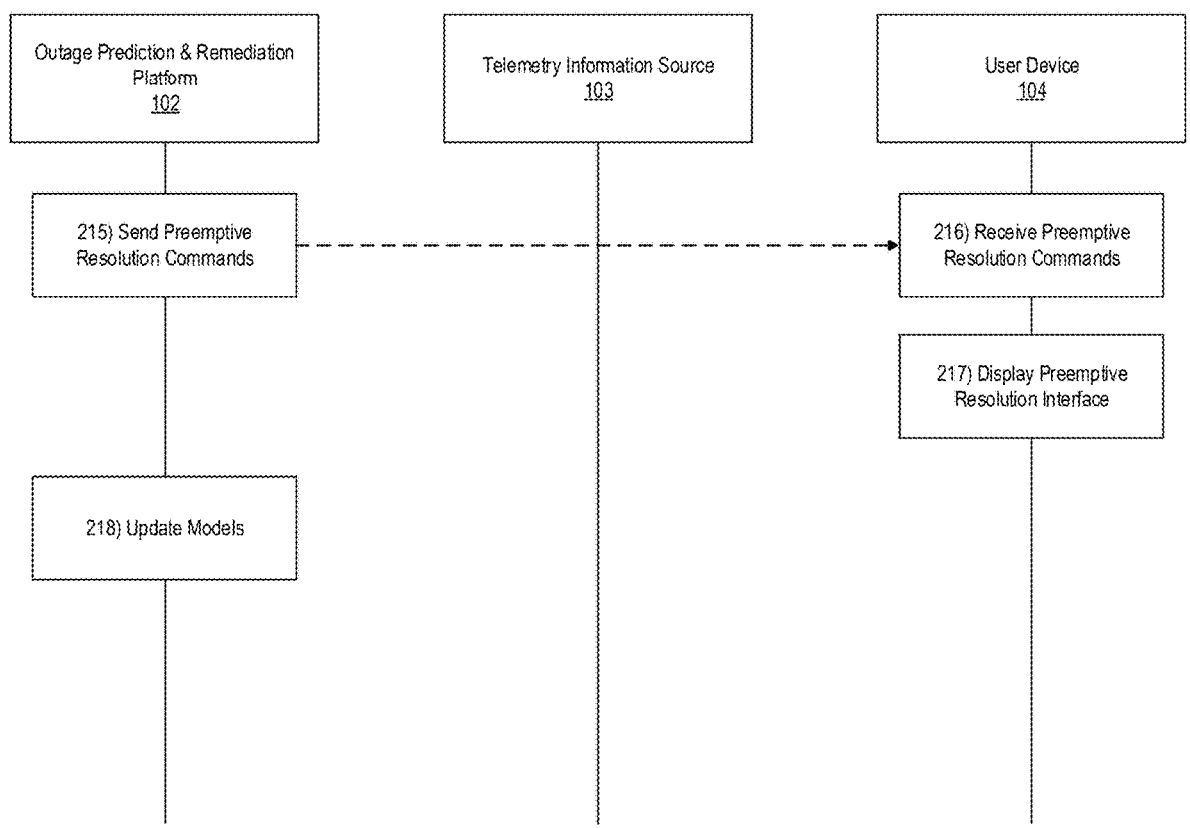

Referring to FIG. 2D, at step 215, the outage prediction and remediation platform 102 may send one or more pre-emptive resolution commands to the user device 104. For example, the outage prediction and remediation platform 102 may, in some instances, identify, based on the identified matching pattern, one or more actions used to resolve the failure (which, in the example of the telemetry state machine images of the state machine may have actually occurred, but may, in the example of the initial/additional telemetry state machine images be predicted to occur). Accordingly, the outage prediction and remediation platform 102 may effectively identify, based on previously performed corrective actions for a given failure, actions that may be performed to preemptively avoid the failure (which may, e.g., be predicted to occur).

In some instances, the outage prediction and remediation platform 102 may identify a confidence level corresponding to the likelihood of failure. In some instances, this may be based on a matching level identified by the outage prediction and remediation platform 102 corresponding to the initial/additional telemetry state images and the historical telemetry state images (e.g., by the CNN) and/or corresponding to the telemetry state pattern of the initial/additional telemetry state images and the identified matching pattern (e.g., by the RNN). Additionally or alternatively, this may be based on a confidence that the identify remediation action will preemptively avoid the predicted failure.

Figure 4:
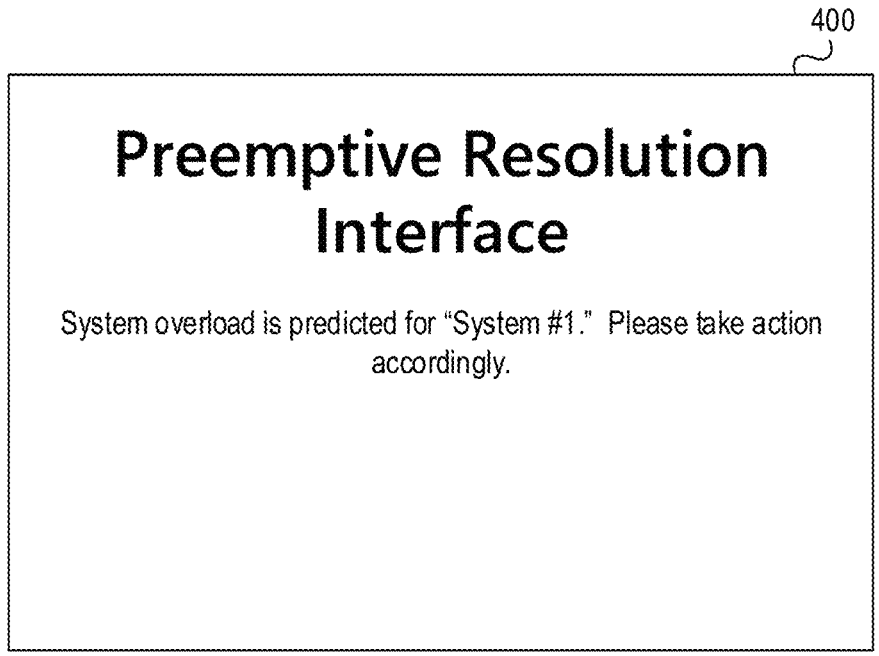
FIGS. 4-6 depict illustrative user interfaces for using hybrid deep learning to perform multi image matching for outage prediction, prevention, and mitigation in accordance with one or more example embodiments.

In some instances, the outage prediction and remediation platform 102 may identify that the confidence level fails to meet or exceed a first confidence threshold. In these instances, the outage prediction and remediation platform 102 may send a graphical user interface similar to graphical user interface 400, which is shown in FIG. 4, to the user device 104. For example, based on a relatively low confidence that an identified corrective action may be effective (or a failure to identify any particular action at all) and/or that an identified system performance pattern matches a historical pattern, the outage prediction and remediation platform 102 may merely send a notification of the predicted failure and prompt for action to be taken accordingly.

Figure 5:
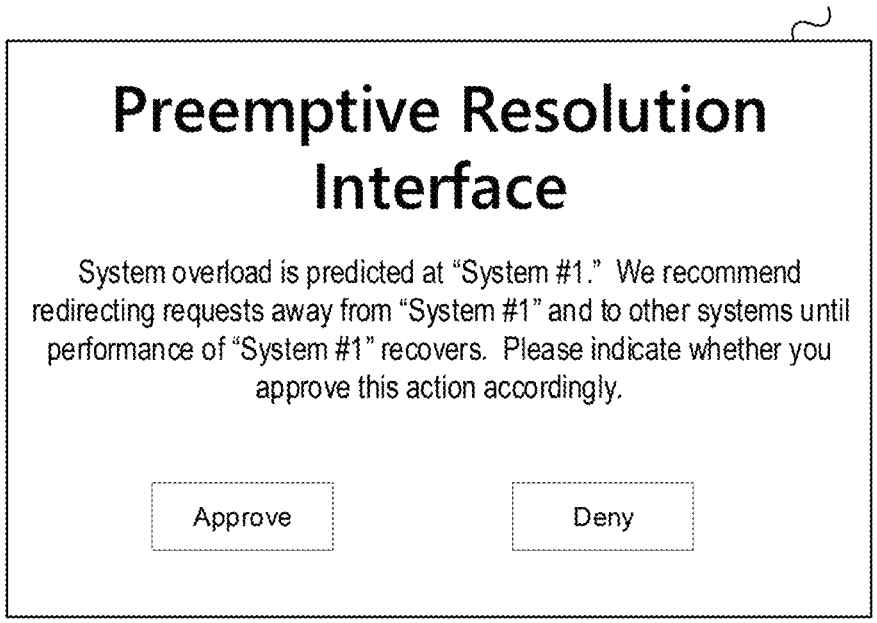

In some instances, the outage prediction and remediation platform 102 may identify that the confidence level meets or exceeds the first confidence threshold, but fails to meet or exceed a second confidence threshold (which may be higher than the first confidence threshold). In these instances, the outage prediction and remediation platform 102 may send a graphical user interface similar to graphical user interface 500, which is shown in FIG. 5, to the user device 104. For example, based on a medium level of confidence that an identified corrective action may be effective and/or that an identified system performance pattern matches a historical pattern, the outage prediction and remediation platform 102 may send a notification of the predicted failure and an identified remediating action. In this example, the outage prediction and remediation platform 102 may prompt a user to approve or reject the identified remediating action, and may automatically execute the action accordingly if approval is received.

Figure 6:
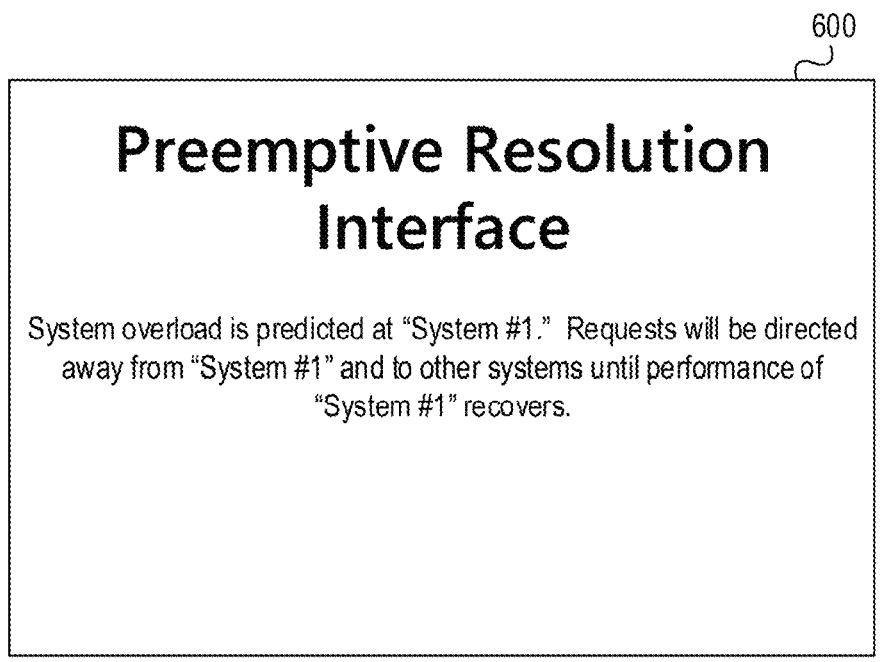

In some instances, the outage prediction and remediation platform 102 may identify that the confidence level meets or exceeds the second confidence threshold. In these instances, the outage prediction and remediation platform 102 may send a graphical user interface similar to graphical user interface 600, which is shown in FIG. 6, to the user device 104. For example, based on a relatively high level of confidence that an identified corrective action may be effective and/or that an identified system performance pattern matches a historical pattern, the outage prediction and remediation platform 102 may send a notification of the predicted failure, an identified remediating action, and an indication that the identified action will be automatically executed. In this example, the outage prediction and remediation platform 102 may also send commands directing performance of the identified action (which may, e.g., cause execution of the identified action). For example, the outage prediction and remediation platform 102 may send one or more commands directing a packet routing system, load balancing system, and/or other system to redirect requests, data, and/or information away from a first system (identified as overloaded) and towards one or more alternative systems, which may, e.g., cause the routing system to adjust the flow of information accordingly. In some instances, the outage prediction and remediation platform 102 may send the preemptive resolution commands to the user device 104 via the communication interface 113 and while the second wireless data connection is established.

At step 216, the user device 104 may receive the preemptive resolution commands sent at step 215. For example, the user device 104 may receive the preemptive resolution commands while the second wireless data connection is established.

At step 217, based on or in response to the one or more preemptive resolution commands, the user device 104 may display a pre-emptive resolution interface (e.g., similar to graphical user interface 400 of FIG. 4, graphical user interface 500 of FIG. 5, graphical user interface 600 of FIG. 6, and/or otherwise). In some instances, such as where a graphical user interface similar to graphical user interface 500 of FIG. 5 is displayed, user selection of an interface element may trigger the execution of one or more remediation actions indicated in the interface. For example, if the user approves a proposed action, their selection may notify the outage prediction and remediation platform 102, which may, e.g., cause performance of the proposed action accordingly.

At step 218, the outage prediction and remediation platform 102 may update the hybrid deep learning model (e.g., the CNN and/or RNN) based on the initial telemetry state image, the additional telemetry state image, the corresponding transition, the corresponding pattern, an identified likelihood of failure, an identified remediating action, and/or other information. In doing so, the outage prediction and remediation platform 102 may continue to refine the hybrid deep learning model using a dynamic feedback loop, which may, e.g., increase the accuracy and effectiveness of the model in predicting and remediating potential system failures.

For example, the outage prediction and remediation platform 102 may use the initial telemetry state image, the additional telemetry state image, the corresponding transition, the corresponding pattern, an identified likelihood of failure, an identified remediating action, and/or other information to reinforce, modify, and/or otherwise update the hybrid deep learning model, thus causing the model to continuously improve (e.g., in terms of predicting and remediating system failures).

In some instances, the outage prediction and remediation platform 102 may continuously refine the CNN and/or RNN. In some instances, the outage prediction and remediation platform 102 may maintain an accuracy threshold for the hybrid deep learning model, and may pause refinement (through the dynamic feedback loops) of the model if the corresponding accuracy is identified as greater than the corresponding accuracy threshold. Similarly, if the accuracy fails to be equal or less than the given accuracy threshold, the outage prediction and remediation platform 102 may resume refinement of the model through the corresponding dynamic feedback loop.

Although only initial and one instance of additional telemetry data are described herein, this is for illustrative purposes only, and any number of additional rounds of telemetry data may be received and analyzed by the hybrid deep learning model using similar techniques to those described above. For example, as illustrated in FIG. 10, four or more sets of telemetry data (e.g., four separate time instances) may, in some instances be used to identify a pattern. In these instances, the likelihood of failure may be modified and/or otherwise adjusted based on newly received telemetry data.

Furthermore, although the use of a hybrid deep learning model is primarily described, in some instances, alternative techniques, such as the use of a state machine may be used to produce similar results without departing from the scope of the disclosure. For example, the state machine may be used in addition or as an alternative to the hybrid deep learning model. Furthermore, although the analysis of system telemetry data is primarily described, the methods described above may be used to analyze other types of information (e.g., application performance information, or the like) for failure prevention without departing from the scope of the disclosure.

Figure 3:
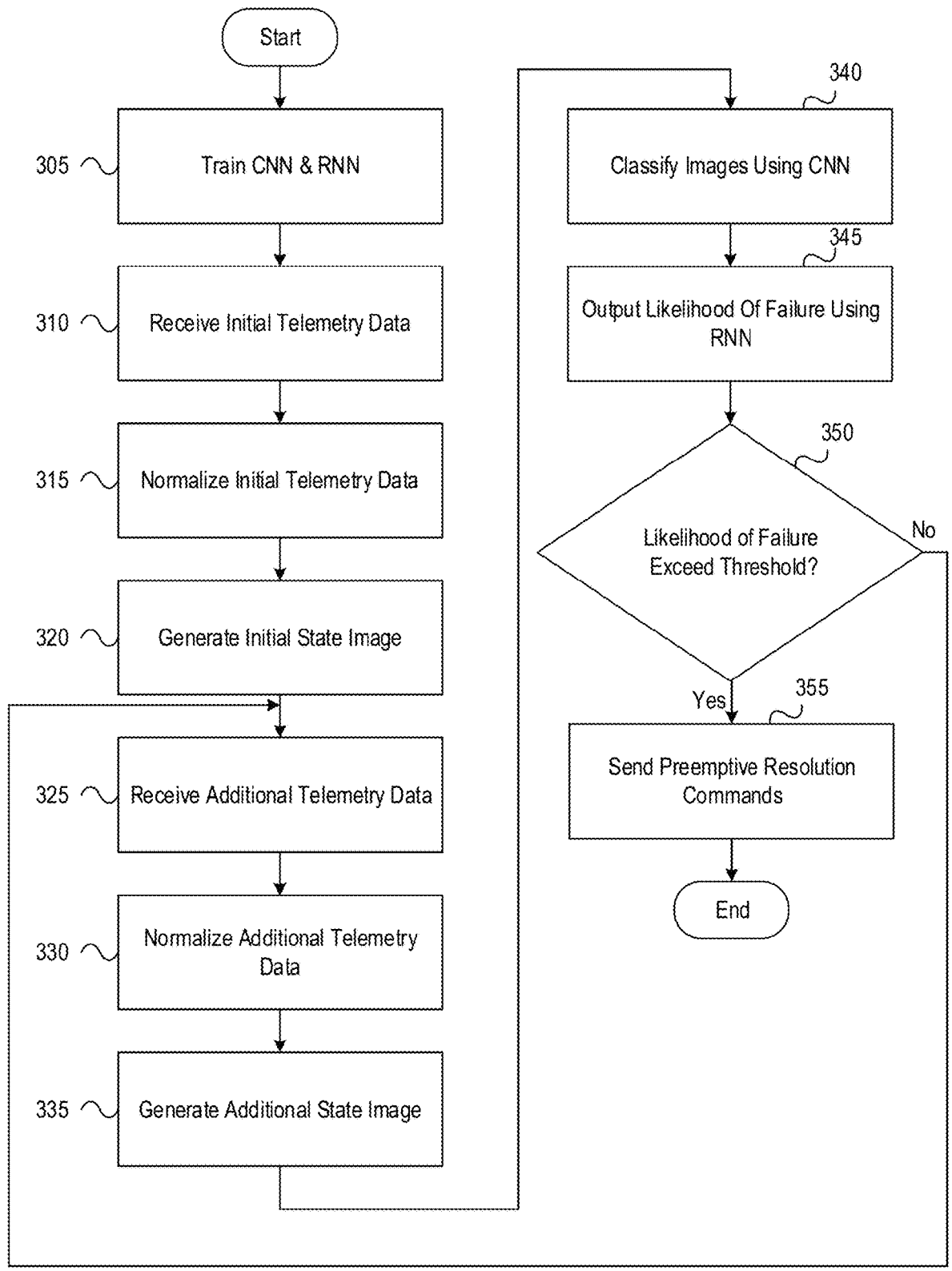
FIG. 3 depicts an illustrative method for using hybrid deep learning to perform multi image matching for outage prediction, prevention, and mitigation in accordance with one or more example embodiments.

FIG. 3 depicts an illustrative method for using a hybrid deep learning model to perform multi image matching for outage prediction, prevention, and mitigation in accordance with one or more example embodiments. Referring to FIG. 3, at step 305, a computing platform comprising one or more processors, memory, and a communication interface may train a hybrid deep learning model that includes a CNN and an RNN. At step 310, the computing platform may receive initial telemetry data. At step 315, the computing platform may normalize the initial telemetry data. At step 320, the computing platform may generate an initial state image based on the normalized initial telemetry data. At step 325, the computing platform may receive additional telemetry data. At step 330, the computing platform may normalize the additional telemetry data. At step 335, the computing platform may generate an additional state image based on the normalized additional telemetry data. At step 340, the computing platform may classify the initial and/or additional state images. At step 345, the computing platform may output a likelihood of failure using the RNN. At step 350, the computing platform may identify whether or not a likelihood of failure threshold is exceeded. If so, the computing platform may proceed to step 355 to send preemptive resolution commands. If not, the computing platform may return to step 325 to receive additional telemetry data.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform for predicting and automatically remediating system outages, comprising:
   at least one processor;
   a communication interface communicatively coupled to the at least one processor; and
   memory storing computer-readable instructions that, when executed by the at least one processor, cause the computing platform to:
   train a hybrid deep learning model to predict system failure for a system based on telemetry state images and transitions between the telemetry state images, wherein the hybrid deep learning model includes a convolutional neural network (CNN) and a recurrent neural network (RNN), wherein training the hybrid deep learning model comprises:
   collecting telemetry data,
   generate a first training data set by:
   normalizing the telemetry data, and
   generating, based on the normalized telemetry data, telemetry state images,
   training the hybrid deep learning model in a first stage using the first training data set, creating a second training data set for a second stage of training comprising the first training data, historical patterns of the telemetry state images, and historical failure information, and training hybrid deep learning model in a second stage using the second training data set, wherein training the hybrid deep learning model using the first stage and the second stage improves a speed and an accuracy with which the computing platform predicts the system outages by incorporating patterns of previous and potential future states, associated with the telemetry data, along with corresponding transitions between the previous and potential future states into the prediction;

receive initial telemetry data;

generate, based on the initial telemetry data, an initial telemetry state image;

receive additional telemetry data;

generate, based on the additional telemetry data, an additional telemetry state image;

classify, using the CNN and based on historical telemetry state images, the initial telemetry state image and the additional telemetry state image;

identify, using the RNN and based on the classified telemetry state images and transitions between the classified telemetry state images, a matching pattern, wherein the RNN is enhanced using long short term memory (LSTM) and hierarchic layers, and wherein one or more of the LSTM or the hierarchic layers are toggled on and off based on an error rate of the RNN;

identify, using the identified matching pattern, a likelihood of failure for the system and one or more actions to prevent a predicted failure associated with the likelihood of failure;

identify a confidence level corresponding to the likelihood of failure, indicating a likelihood that the one or more actions will prevent the predicted failure;

compare the confidence level to a confidence threshold;

based on identifying that the confidence level exceeds the threshold, send, based on the likelihood of failure for the system, one or more preemptive resolution commands causing automatic modification of operations at the system to prevent the predicted failure, wherein causing the automatic modification of the operations comprises directing a packet routing system to direct requests away from the system and toward a different system;

generate a third training data set comprising the first training data set, the second training data set, the initial telemetry state image, the additional telemetry state image, the matching pattern, and the likelihood of failure; and train the hybrid deep learning model in a third stage using the third training data set to further increase the speed and the accuracy with which the computing platform predicts the system outages.

2. The computing platform of claim 1, wherein training the CNN comprises training the CNN to classify input telemetry data state images as matching one of the historical telemetry state images.

3. The computing platform of claim 2, wherein training the RNN comprises training the RNN to identify a match between:

a pattern defined by the classified input telemetry data state images and their corresponding transitions, and a stored pattern defined by the historical telemetry state images and their corresponding transitions.

4. The computing platform of claim 3, wherein training the RNN further trains the RNN to identify, based on the matching pattern, the likelihood of failure.

5. The computing platform of claim 1, wherein a first layer of the RNN is configured to perform pattern matching at a first level of granularity, and wherein a second layer of the RNN is configured to perform pattern matching at a second level of granularity, wherein the second level of granularity is more detailed than the first level of granularity.

6. The computing platform of claim 1, wherein identifying the likelihood of failure for the system further comprises using a rules-based state machine to identify the likelihood of failure.

7. The computing platform of claim 1, wherein identifying, using the identified matching pattern, the likelihood of failure for the system comprises:

identify a likelihood of failure of the matching pattern, wherein the matching pattern is labelled based on the likelihood of failure of the matching pattern.

8. The computing platform of claim 1, wherein the memory stores additional computer readable instructions that, when executed by the at least one processor, cause the computing platform to:

compare the likelihood of failure of the matching pattern to a failure threshold, wherein sending the one or more preemptive resolution commands causing modification of the operations at the system to prevent the predicted failure is in response to identifying that the likelihood of failure of the matching pattern meets or exceeds the failure threshold.

9. The computing platform of claim 1, wherein sending the one or more preemptive resolution commands comprises directing a user device to display a recommended solution to avoid the predicted failure along with a prompt for whether or not the recommended solution should be executed.

10. The computing platform of claim 9, wherein the memory stores additional computer readable instructions that, when executed by the at least one processor, cause the computing platform to:

receive user input accepting the recommended solution; and execute, in response to receiving the user input, the recommended solution.

11. The computing platform of claim 1, wherein the memory stores additional computer readable instructions that, when executed by the at least one processor, cause the computing platform to:

receive third telemetry data;

generate, based on the third telemetry data, a third telemetry state image;

classify, using the CNN and based on historical telemetry state images, the third telemetry state image, wherein classifying the third telemetry state image results in an updated set of classified telemetry state images;

identify, using the RNN and based on the updated set of classified telemetry state images and transitions between the updated set of classified telemetry state images, an updated matching pattern; and identify, using the identified updated matching pattern, a new likelihood of failure for the system.

12. The computing platform of claim 1, wherein generating the initial telemetry state image comprises using green to represent any values from 0-3 inclusive, using yellow to represent any values from 3.1-6 inclusive, and red to represent any values from 6.1-10 inclusive.

13. The computing platform of claim 1, wherein identifying the matching pattern comprises:

identifying that the classified telemetry state images comprises a first telemetry state image of a first pattern and a second telemetry state image of a second pattern,
identifying a transition between the first pattern and the second pattern,
identifying the matching pattern that includes a progression from the first pattern to the second pattern according to the transition.

14. A method comprising:
at a computing platform comprising at least one processor, a communication interface, and memory:
training a hybrid deep learning model to predict system failure for a system based on telemetry state images and transitions between the telemetry state images, wherein the hybrid deep learning model includes a convolutional neural network (CNN) and a recurrent neural network (RNN), wherein training the hybrid deep learning model comprises:
collecting telemetry data,
generate a first training data set by:
normalizing the telemetry data, and
generating, based on the normalized telemetry data, telemetry state images,
training the hybrid deep learning model in a first stage using the first training data set,
creating a second training data set for a second stage of training comprising the first training data, historical patterns of the telemetry state images, and historical failure information, and
training hybrid deep learning model in a second stage using the second training data set, wherein training the hybrid deep learning model using the first stage and the second stage improves a speed and an accuracy with which the computing platform predicts the system outages by incorporating patterns of previous and potential future states, associated with the telemetry data, along with corresponding transitions between the previous and potential future states into the prediction;
receiving initial telemetry data;
generating, based on the initial telemetry data, an initial telemetry state image;
receiving additional telemetry data;
generating, based on the additional telemetry data, an additional telemetry state image;
classifying, using the CNN and based on historical telemetry state images, the initial telemetry state image and the additional telemetry state image;
identifying, using the RNN and based on the classified telemetry state images and transitions between the classified telemetry state images, a matching pattern, wherein the RNN is enhanced using long short term memory (LSTM) and hierarchic layers, and wherein one or more of the LSTM or the hierarchic layers are toggled on and off based on an error rate of the RNN;
identifying, using the identified matching pattern, a likelihood of failure for the system and one or more actions to prevent a predicted failure associated with the likelihood of failure;
identifying a confidence level corresponding to the likelihood of failure, indicating a likelihood that the one or more actions will prevent the predicted failure;
comparing the confidence level to a confidence threshold;
based on identifying that the confidence level exceeds the threshold, sending, based on the likelihood of failure for the system, one or more preemptive resolution commands causing automatic modification of operations at the system to prevent the predicted failure, wherein causing the automatic modification of the operations comprises directing a packet routing system to direct requests away from the system and toward a different system;
generating a third training data set comprising the first training data set, the second training data set, the initial telemetry state image, the additional telemetry state image, the matching pattern, and the likelihood of failure; and
training the hybrid deep learning model in a third stage using the third training data set to further increase the speed and the accuracy with which the computing platform predicts the system outages.

15. The method of claim 14, wherein training the CNN comprises training the CNN to classify input telemetry data state images as matching one of the historical telemetry state images.

16. The method of claim 15, wherein training the RNN comprises training the RNN to identify a match between:
a pattern defined by the classified input telemetry data state images and their corresponding transitions, and
a stored pattern defined by the historical telemetry state images and their corresponding transitions.

17. The method of claim 16, wherein training the RNN further trains the RNN to identify, based on the matching pattern, the likelihood of failure.

18. The method of claim 14, wherein a first layer of the RNN is configured to perform pattern matching at a first level of granularity, and wherein a second layer of the RNN is configured to perform pattern matching at a second level of granularity, wherein the second level of granularity is more detailed than the first level of granularity.

19. The method of claim 14, wherein identifying the likelihood of failure for the system further comprises using a rules-based state machine to identify the likelihood of failure.

20. One or more non-transitory computer-readable media storing instructions that, when executed by a computing platform comprising at least one processor, a communication interface, and memory, cause the computing platform to:
train a hybrid deep learning model to predict system failure for a system based on telemetry state images and transitions between the telemetry state images, wherein the hybrid deep learning model includes a convolutional neural network (CNN) and a recurrent neural network (RNN), wherein training the hybrid deep learning model comprises:
collecting telemetry data,
generate a first training data set by:
normalizing the telemetry data, and
generating, based on the normalized telemetry data, telemetry state images,
training the hybrid deep learning model in a first stage using the first training data set,
creating a second training data set for a second stage of training comprising the first training data, historical patterns of the telemetry state images, and historical failure information, and
training hybrid deep learning model in a second stage using the second training data set, wherein training the hybrid deep learning model using the first stage and the second stage improves a speed and an accuracy with which the computing platform predicts the system outages by incorporating patterns of previous and potential future states, associated with the telemetry data, along with corresponding transitions between the previous and potential future states into the prediction;

receive initial telemetry data;

generate, based on the initial telemetry data, an initial telemetry state image;

receive additional telemetry data;

generate, based on the additional telemetry data, an additional telemetry state image;

classify, using the CNN and based on historical telemetry state images, the initial telemetry state image and the additional telemetry state image;

identify, using the RNN and based on the classified telemetry state images and transitions between the classified telemetry state images, a matching pattern, wherein the RNN is enhanced using long short term memory (LSTM) and hierarchic layers, and wherein one or more of the LSTM or the hierarchic layers are toggled on and off based on an error rate of the RNN;

identify, using the identified matching pattern, a likelihood of failure for the system and one or more actions to prevent a predicted failure associated with the likelihood of failure;

identify a confidence level corresponding to the likelihood of failure, indicating a likelihood that the one or more actions will prevent the predicted failure;

compare the confidence level to a confidence threshold;

based on identifying that the confidence level exceeds the threshold, send, based on the likelihood of failure for the system, one or more preemptive resolution commands causing automatic modification of operations at the system to prevent the predicted failure, wherein causing the automatic modification of the operations comprises directing a packet routing system to direct requests away from the system and toward a different system;

generate a third training data set comprising the first training data set, the second training data set, the initial telemetry state image, the additional telemetry state image, the matching pattern, and the likelihood of failure; and train the hybrid deep learning model in a third stage using the third training data set to further increase the speed and the accuracy with which the computing platform predicts the system outages.

\* \* \* \* \*